(12) United States Patent
Lai (10) Patent No.: US 7,232,319 B1
(45) Date of Patent: Jun. 19, 2007

(54) COMPUTER SIDE PLATE WHICH CAN BE QUICKLY ASSEMBLED OR DISASSEMBLED

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 0 days.

(21) Appl. No.: 11/404,743

(22) Filed: Apr. 14, 2006

(51) Int. Cl.
*H01R 13/44* (2006.01)
*H05K 5/00* (2006.01)

(52) U.S. Cl. .................................. 439/135; 312/223.2

(58) Field of Classification Search ............... 439/135, 439/136, 138; 312/223.2; 361/683, 724
See application file for complete search history.

(56) References Cited

U.S. PATENT DOCUMENTS 6,123,557 A * 9/2000 Wang et al. ............... 439/137
6,932,447 B2 * 8/2005 Chen et al. ............... 312/223.2
7,193,855 B2 * 3/2007 Fan et al. .................... 361/724
2006/0028103 A1 * 2/2006 Smith et al. ............. 312/223.2

* cited by examiner

*Primary Examiner*—Hien Vu
(74) *Attorney, Agent, or Firm*—Pro-Techtor Int'l Services (57) ABSTRACT

A computer side plate which can be quickly assembled or disassembled is provided with inverted hooks and hook seats on the side plate of computer, which are locked on a movable plate at a top end of computer casing and on a bottom edge of computer casing, respectively. When the side plate is to be removed, a push knob on a rack at an inner side of a back panel of computer is pressed, and then a push block of a board lump inside the push knob can drive a push rod inward to carry the moveable plate to be displaced, thereby enabling hook holes on the movable plate to be released from the inverted hooks of side plate, such that the side plate can be easily and quickly disassembled.

2 Claims, 8 Drawing Sheets

COMPUTER SIDE PLATE WHICH CAN BE QUICKLY ASSEMBLED OR DISASSEMBLED

BACKGROUND OF THE INVENTION (a) Field of the Invention

The present invention relates to a computer side plate and more particularly to a computer side plate which can be assembled or disassembled without using any tool, thereby being operated very quickly and easily.

(b) Description of the Prior Art

A conventional computer side plate is fixed at a side of computer with screws, which requires a tool such as a screw driver to disassemble or assemble when installing or removing the side plate, thereby wasting a man power and time.

SUMMARY OF THE INVENTION

The primary object of present invention is to provide a computer side plate, which can be locked on a computer casing using inverted hooks and hook seats on the side plate; whereas in removing the side plate, it can be easily disassembled by pressing a push knob, thereby being very easily and quickly to be disassembled.

To enable a further understanding of the said objectives and the technological methods of the invention herein, the brief description of the drawings below is followed by the detailed description of the preferred embodiments.

BRIEF DESCRIPTION OF THE DRAWINGS

FIG. 4-1 shows an upper cross-sectional view of a part of structures of the present invention (when a side plate is locked).

FIG. 4-2 shows an upper cross-sectional view of a part of structures of the present invention (when a side plate is released).

FIG. 5-1 shows a schematic view of an appearance at a rear side of inner frame and rack of the present invention.

FIG. 5-2 shows a schematic view of an appearance at a front side of inner frame and rack of the present invention.

FIG. 6-1 shows a schematic view of an appearance of a push knob of the present invention.

FIG. 6-2 shows a schematic view of an appearance of a board lump of the present invention.

FIG. 6-3 shows a schematic view of an appearance of a push rod of the present invention.

FIG. 7-1 shows a partial plan view of a side face of the present invention (when a side plate is locked).

FIG. 7-2 shows a partial plan view of a side face of the present invention (when a side plate is released).

DETAILED DESCRIPTION OF THE PREFERRED EMBODIMENTS

Figure 1:
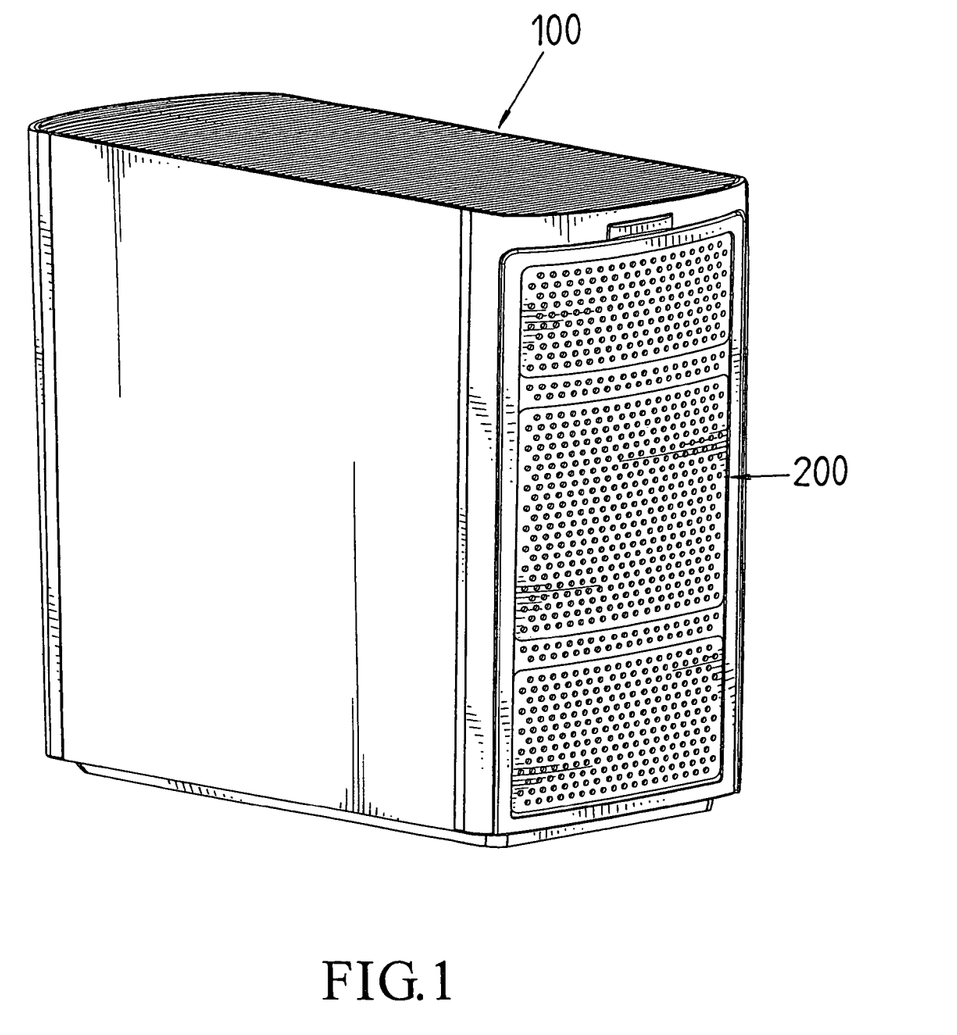
FIG. 1 shows a schematic view of an appearance of the present invention.
Figure 2:
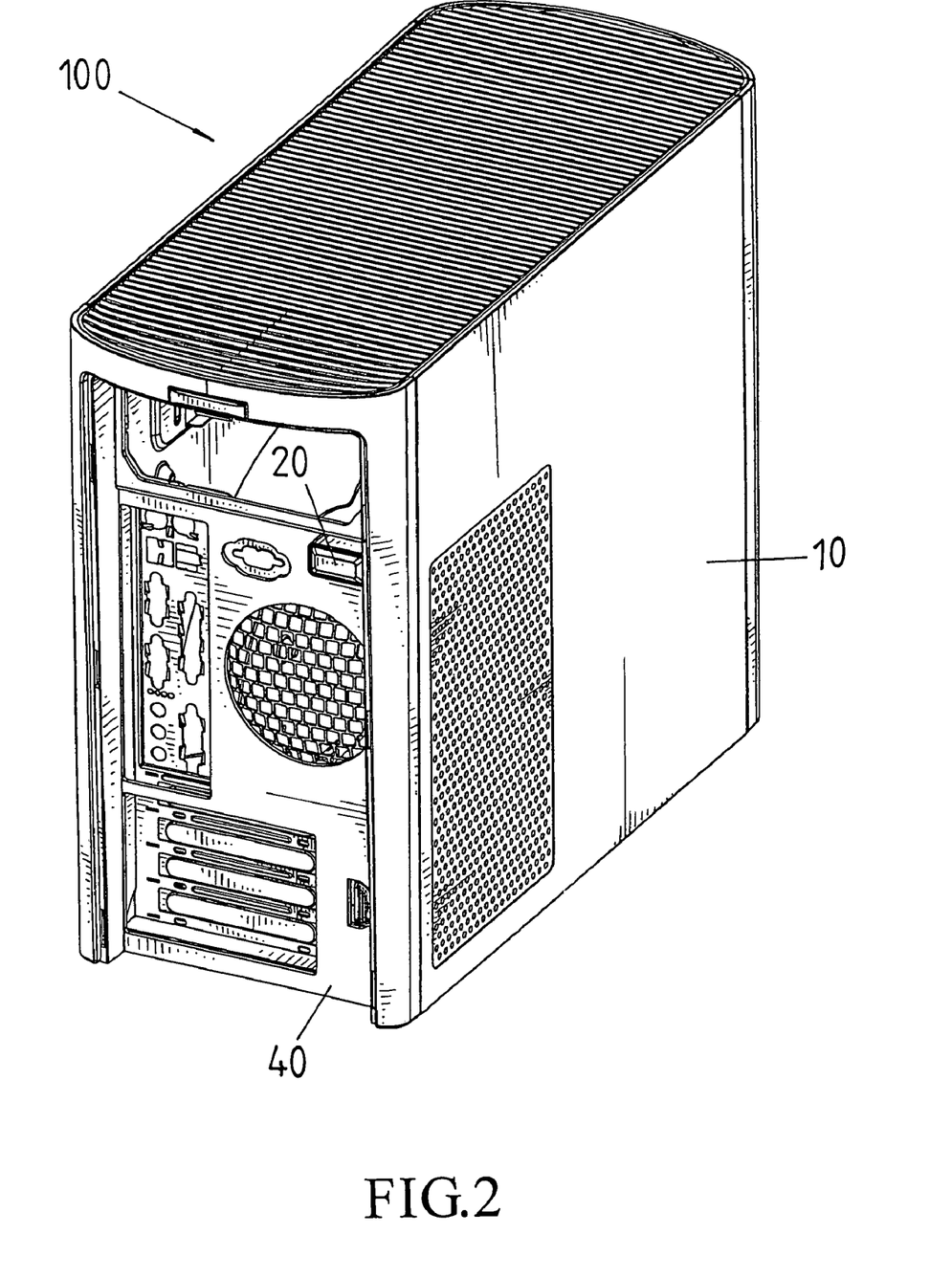
FIG. 2 shows a schematic view of an appearance of the present invention after disassembling a back panel.
Figure 3:
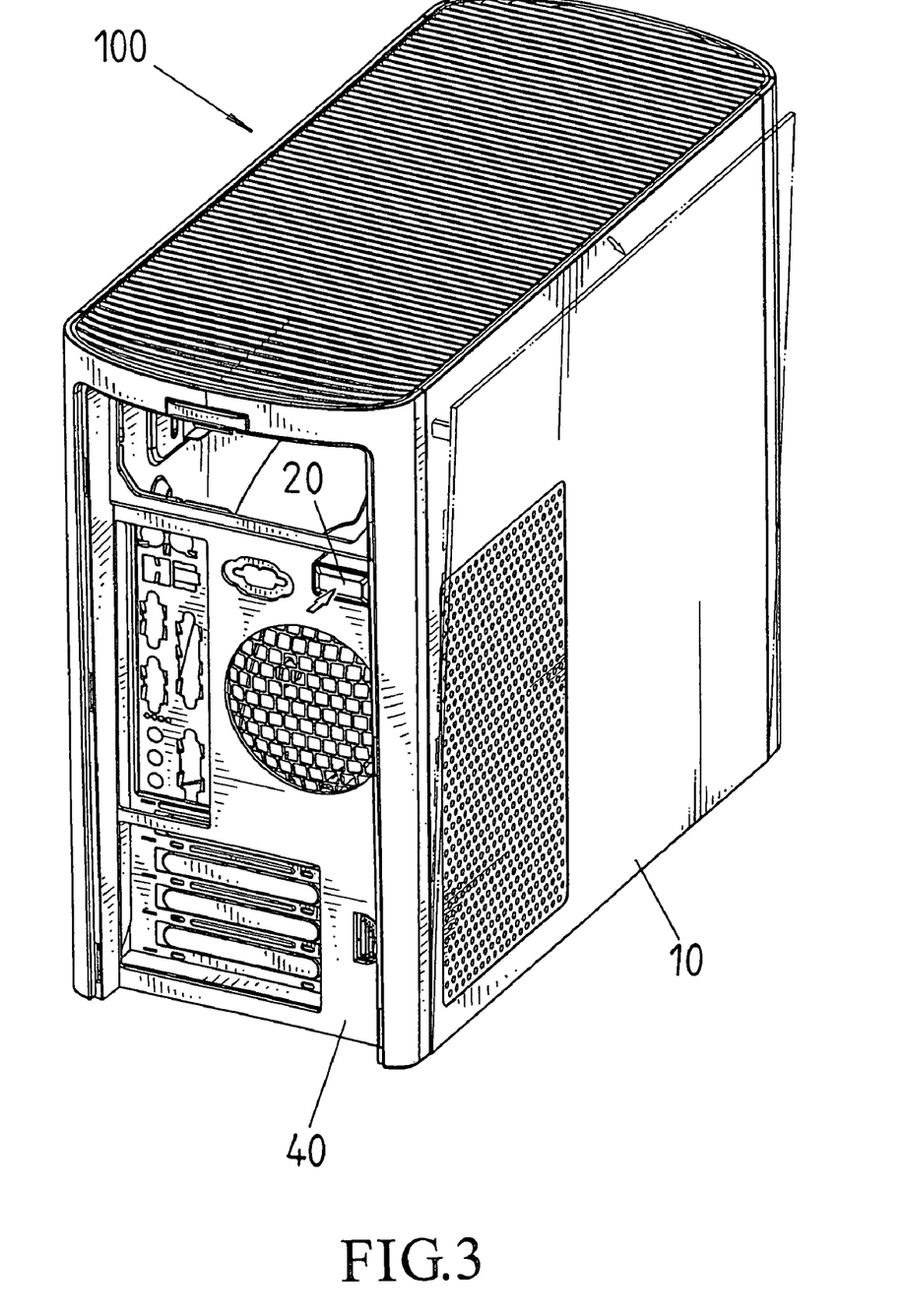
FIG. 3 shows a schematic view of an appearance of the present invention after disassembling a side plate.

A rear side of a computer 100 is provided with a back panel 200, as shown in FIG. 1, and FIG. 2 shows a drawing in which the back panel 200 has been disassembled. An inner side of the back panel 200 of computer 100 is installed with a push knob 20 which can be pressed to quickly disassemble a side plate 10 (as shown in FIG. 3).

Figure 4:
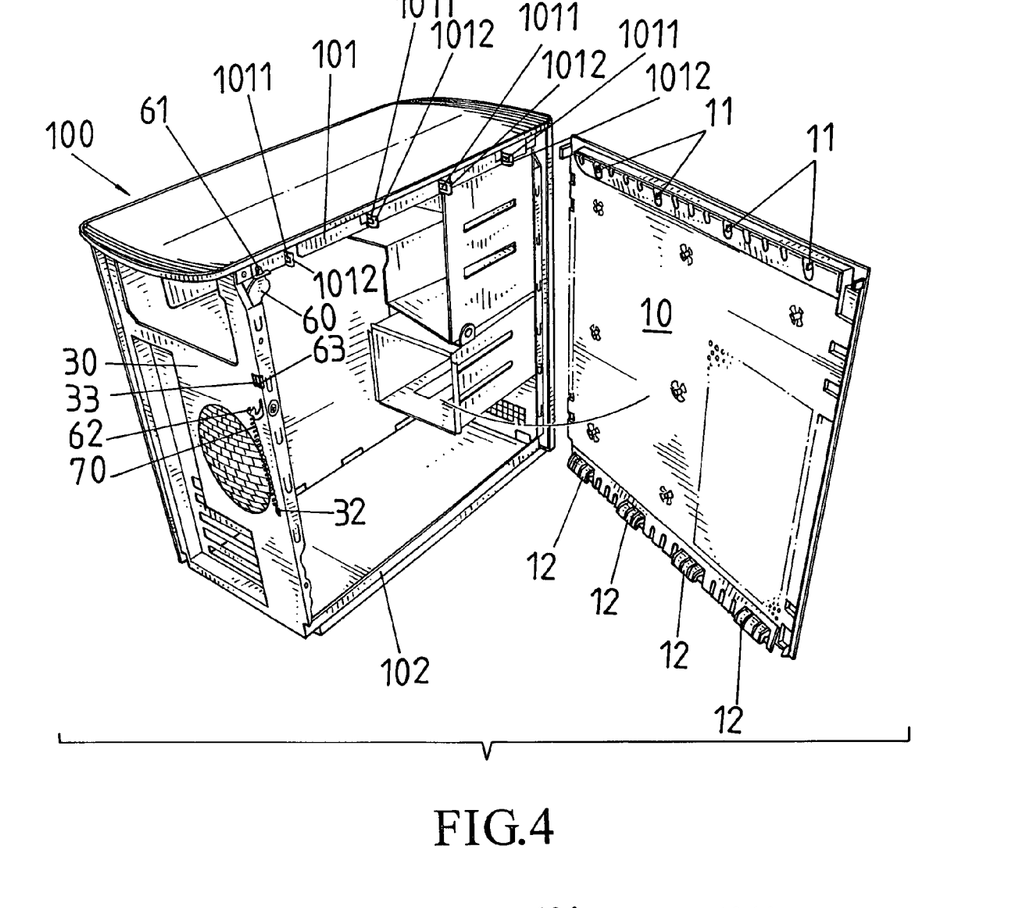
FIG. 4 shows an exploded view of the present invention.
Figure 5:
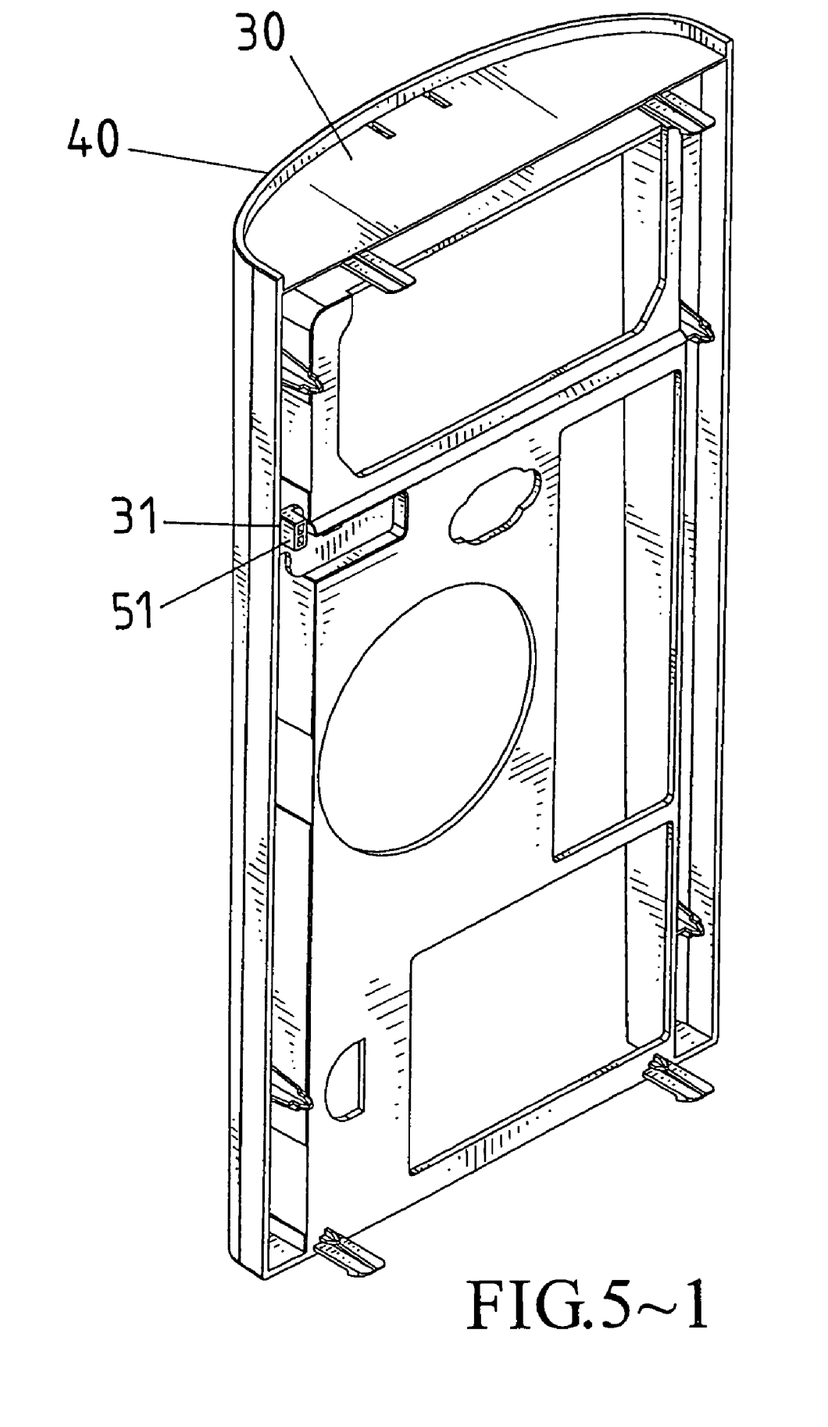
Figure 6:
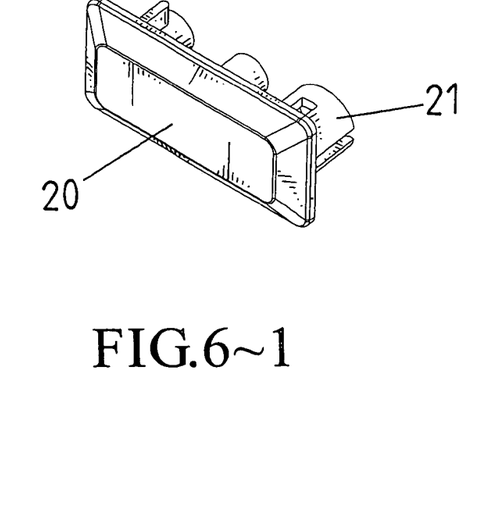
Figure 7:
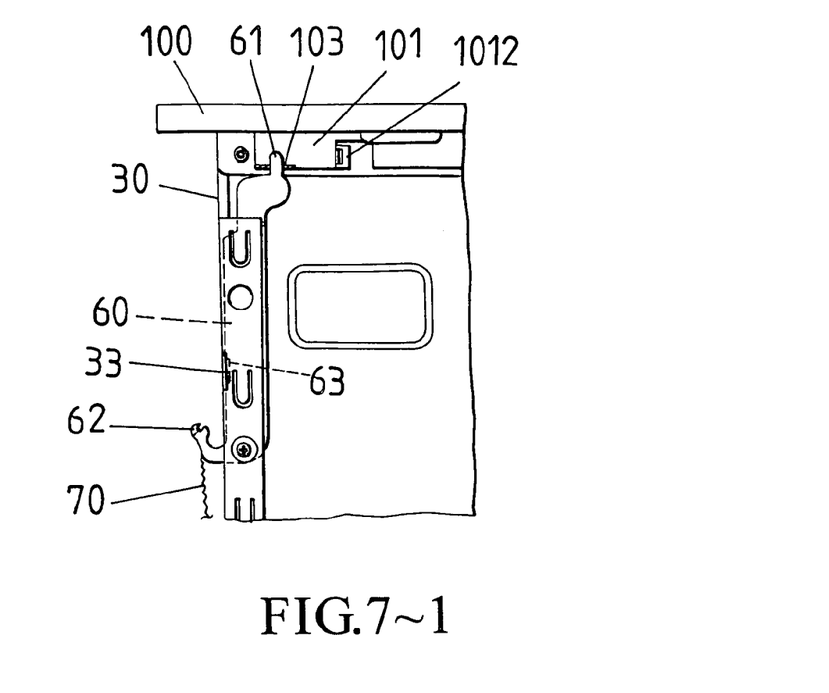

Referring to FIG. 4, a top edge at a side face of a casing of computer 100 is installed with a transversal movable plate 101 on which is provided with a plurality of projected pieces 1012 having hook holes 1011, and a top edge of side plate 10 is provided with a plurality of inverted hooks which are locked into the hook holes 1011 of movable plate 101, respectively. A bottom end of the side plate 10 is provided with a plurality of hook seats 12 in an inverted-L shape which are fixed on a transversal bottom edge 102 of the casing of computer 100, respectively. Referring to FIG. 4-1, when the movable plate 101 is not being pushed to be displaced, the inverted hooks 11 of side plate 10 are fixed into the hook holes 1011 of movable plate 101; whereas, as shown in FIG. 4-2, when the movable plate 101 is being pushed to be displaced, the inverted hooks 11 of side plate 10 are released from the hook holes 1011 of movable plate 101, such that the side plate 10 can be disassembled.

Referring to FIG. 5-1 and FIG. 5-2, an interior of the back panel of computer is provided with an inner frame 30 and a rack 40 which are superimposed together, a side of the inner frame 30 is provided with a through-hole 31, a slot 41 at a side of the rack 40 can provide for a locking of the push knob 20, an end of inner side of the push knob 20 is provided with a lock seat 21 (as shown in FIG. 6-1) which can provide for a locking of a board lump 50 (as shown in FIG. 6-2), and an inner side of the board lump 50 is provided with a push block 51 which can be transfixed into the through-hole 31 of inner frame 30 (as shown in FIG. 5-1). Referring to FIG. 6-3 and FIG. 7-1, a side of the inner frame 30 is installed with a push rod 60, a top end of which is provided with a hook block 61 being fixed into the hook hole 103 of movable plate 101, and a bottom end of which is provided with a spring hook 62 being locked with an elastic member 70. A most bottom end of the elastic member 70 is hooked into a hole 32 of inner frame 30 (as shown in FIG. 4), and a side in a center of the push rod 60 is provided with a bending piece 63 which is emplaced in a concaved hole 33 at a middle section of the inner frame 30 (as shown in FIG. 4).

Referring to FIG. 7-1, when the side plate 10 is locked on a side of computer, the movable plate 100 is not displaced. Referring to FIG. 7-2, when a right side of the push knob 20 is pressed, the push block 51 of board lump 50 in the inner side of push knob 20 will drive the bending piece 63 of push rod 60 inward to push aside an upper end of the push rod 60, extend the elastic member 70, and carry the movable plate 101 to be displaced, then the hook holes 101 on the movable plate 100 will be released from the locking of inverted hooks 11 of side plate 10, thereby enabling the side plate 10 to be easily disassembled.

Accordingly, the inverted hooks at the top end and the hook seats at the bottom end of the side plate of present invention are fixed on the movable plate at the top end of a side face of casing and on the bottom edge of a casing, respectively. On the other hand, when the side plate is to be disassembled, the push knob is only required to be pressed to drive the push rod to displace the movable plate, and then the side plate will be quickly and easily disassembled.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A computer enclosure comprising: a side plate which can be quickly assembled or disassembled from a computer, a rear side of the computer is provided with a back panel, a side of the computer is provided with the side plate, and an inner side of the back panel being provided with an inner frame and a rack being superimposed together, the inner side of the back panel being provided with a push knob which can be pressed to disassemble the side plate, a top edge at a side face of computer casing being installed with a movable plate, the movable plate provided with projected pieces extending outwardly and generally perpendicular to the movable plate, each of the projected pieces having a hook hole, and a top edge of the side plate being provided with inverted hooks extending outwardly and generally perpendicular to the side plate, the inverted hooks engageable with the hook holes of the movable plate; a side of the inner frame being provided with a through-hole, a side of the rack being provided with a slot for emplacing the push knob, an inner side of the push knob being provided with a lock seat for locking a board lump, an inner side of the board lump being provided with a push block which is transfixed into the through-hole of inner frame, and an interior at a side of the inner frame being installed with a push rod; a hook block located at a top end of the push rod being fixed into the hook hole of movable plate, a spring hook at a bottom end of the push rod being locked with an elastic member, a bending piece being located at a side in a center of the push rod, a bottom end of the elastic member being hooked into a hole of inner frame, and the bending piece being emplaced in a concaved hole at a middle section of the inner frame; when the push knob being pressed, the push block of board lump in the inner side of push knob driving the bending piece of push rod inward, pushing aside the push rod, extending the elastic member, and carrying the movable plate to be displaced, then the hook holes on movable plate being able to be released from the locking of inverted hooks of the side plate, thereby disassembling the side plate.

2. The enclosure according to claim 1, wherein a bottom end of the side plate is provided with hook seats in an inverted-L shape, and a bottom edge of computer casing can provide for a locking of the hook seats of side plate.

* * * * *